Aug. 20, 1957 R. A. J. DAWSON Re. 24,346

MARINE APPARATUS

Original Filed Jan. 23, 1950 4 Sheets-Sheet 1

Robert A. J. Dawson
INVENTOR.

BY Murray Robinson
ATTORNEY

MARINE APPARATUS

Original Filed Jan. 23, 1950 4 Sheets-Sheet 2

Robert A. J. Dawson
INVENTOR.

BY Murray Robinson
ATTORNEY

MARINE APPARATUS

Original Filed Jan. 23, 1950 4 Sheets-Sheet 3

Robert A. J. Dawson
INVENTOR.

BY Murray Robinson
ATTORNEY

MARINE APPARATUS

Original Filed Jan. 23, 1950 4 Sheets-Sheet 4

INVENTOR
ROBERT A. J. DAWSON

BY Murray Robinson
ATTORNEY

United States Patent Office

Re. 24,346
Reissued Aug. 20, 1957

24,346

MARINE APPARATUS

Robert A. J. Dawson, West University Place, Tex.

Original No. 2,675,681, dated April 20, 1954, Serial No. 140,102, January 23, 1950. Application for reissue April 7, 1955, Serial No. 500,050

11 Claims. (Cl. 61—46.5)

Matter enclosed in heavy brackets [ ] appears in the original patent but forms no part of this reissue specification; matter printed in italics indicates the additions made by reissue.

This application is a continuation, at least in part, of my two co-pending applications Serial No. 85,931 filed April 6, 1949, entitled" Deep Water Submersible Barge," now Patent No. 2,653,452, issued September 29, 1953, and Serial No. 98,559 filed June 11, 1949, entitled "Deep Water Submersible Barges" and of my Application Serial No. 584,330 filed March 23, 1945, entitled "Deep Water Submersible Barges," now abandoned, the latter application have been co-pending with the two first mentioned applications.

This invention pertains to a method and apparatus for conducting operations over, on, and beneath the surface of a body of water. More particularly its utility includes such fields as a floatable, portable base for carrying on subterranean operations under water such as offshore drilling for petroleum.

In any marine or submarine structure a variety of problems of stability occur. Stability is here used in the broad sense of fixity of position under all circumstances. Included in the broad term is the technical meaning of stability of equilibrium or tending to return to initial position following displacement therefrom by some means which is no longer acting, the degree of stability being proportional to the restoring force for a given displacement and the range of stability being the range of displacement over which a positive restoring force is active. If a body does not at least possess stability of equilibrium of a large degree relative to the external forces involved and over a range as great as the maximum displacement allowable, it will not be stable in the broader sense. For if it is not stable to a large degree, small external forces will cause large displacements. And if it is not stable over a sufficient range, a large displacement may cause the body to move to a new position of equilibrium. The general requirement for stable equilibrium of a floating body is that the meta-center be above the center of gravity. The position of the meta-center depends on the shape. The position of the center of gravity depends on the distribution of mass. The higher the meta-center for a given center of gravity and the lower the center of gravity for a given shape, the greater both the degree and range of stability. The requirement for stable equilibrium for a non-floating body is that the vertical through the center of gravity lie within the base of support. The lower the center of gravity and the broader the base, the greater both the degree and range of stability.

In addition to the stability of equilibrium, other factors enter into the picture as to general stability. Principal among these is the effect of variation of quantity and position of the displaced fluid due to changes in the level and contour of the surface of the water, i. e., waves and tides. Waves, which change the angular position of the displaced fluid relative to the axis of an object partially immersed therein, cause pitching and rolling. It is desirable that the meta-center be low to minimize these effects. Both waves and tides, the latter term being used in a broad sense to include any variation in the average surface level of the water, whether due to gravity, wind, water currents, rain, evaporation, or other cause, will create changes in the vertical force acting on a body, tending to cause the body to rise and fall. The actual effect of such change in vertical forces will depend on their magnitude, duration, and frequency, and upon the condition of the body, that, whether it is partially or wholly submerged all or part of the time and whether it is floating or resting on bottom.

Another important factor in the general stability problem is the effect of dynamic forces such as those due to currents in the medium surrounding the body, water currents below the water surface and wind above, also those due to waves at the interface of the air and water.

Rigidity and contour of the bottom are further factors to be considered in connection with a body supported thereon.

In connection with a body being moved in, on, or beneath a body of water, all of the above factors of stability enter into the problem in combination and added thereto are the dynamic and other effects due to motion of the object relative to the adjacent medium, including approaching, breaking away from, and sliding over the bottom of the body of water, horizontal motion and raising and lowering of the object in the water, and passage vertically through and horizontally over the water surface. The problem of stability of apparatus such as contemplated by the present invention is therefore the most complicated of all.

It is an object of the invention to provide such an apparatus which when floating in a body of water will have a maximum of general stability.

It is a further object of the invention to provide such an apparatus which when floating in a body of water will be influenced to a minimum extent by the action of wind, waves, tides, and ocean currents.

It is a further object of the invention to provide such an apparatus which can be lowered and raised from the bottom of the water and a method of so doing by which the apparatus will at all times be stable and safe and under full control.

It is a further object of the invention to provide such an apparatus which when resting on the bottom of a body of water will have a maximum stability.

It is another object of the invention to provide such an apparatus which when resting on the bottom of a body of water will be influenced to a minimum extent by the action of tides, wind, waves and water currents.

It is another object of the invention to provide such an apparatus and method of operation according to which the apparatus safely can be placed and can rest upon and be removed from the bottom of a body of water without regard to the contour and condition thereof.

It is still another object of the invention to provide such an apparatus which can be freed from the suction hold of the bottom of a body of water and a method of so doing by which a maximum force can be exerted on the apparatus without danger thereto and while maintaining complete control thereover.

It is a further object of the invention to provide such an apparatus which can be supported on the bottom of a body of water without danger of becoming entrapped by suction of the bottom and a method of operating such apparatus to lower and raise it to and from the bottom.

It is a further object of the invention to provide such an apparatus suitable for deep water which can be floated in shallow water and a method of so doing.

It is a further object of the invention to provide an apparatus which can be easily transported from place to place in a body of water in floating, semi-floating and non-floating condition and a method of so doing by which the apparatus will at all times be stable and safe and under full control.

It is a further object of the invention to provide such an apparatus and method whereby the level of the above surface portion of the apparatus can be varied as desired.

It is a further object of the invention to provide an improved apparatus serving as a base for offshore drilling for petroleum and a method of operating such apparatus.

Other objects and advantages of the invention will become apparent from the following description of the invention.

Generally, the apparatus of the invention includes a structure comprising a main buoyant body of flat bottom shallow draft broad beam construction carrying an operational deck thereabove, the deck being supported therefrom by long slender horizontally spaced studs. An auxiliary body of less buoyant force than the main body is connected to the structure by means whereby the vertical distance between the centers of buoyancy of the bodies can be adjusted as desired and anchored in adjusted position. The buoyancy of both the main and auxiliary buoyant bodies is adjustable over a range from maximum *positive, i. e. true,* buoyancy to a maximum *negative buoyancy, i. e.* non-buoyant condition. For this purpose the buoyant bodies are made in the form of hollow steel shells subdivided internally into a plurality of compartments which can be selectively filled with water or other fluid when it is desired to reduce buoyancy. The main buoyant body, whether completely submerged or surfaced, has sufficient buoyancy when adjusted for maximum buoyancy to float the entire apparatus.

For normal deep water floating condition of the structure, the buoyancies of the bodies are adjusted so that the structure floats with the auxiliary buoyant body just at the surface of the water, the deck above water, and the main buoyant body well below the surface. In this normal floating condition the apparatus is very stable because not only is the metacenter low, that is, close above the center of gravity, which reduces the speed and amplitude of transient rolling and pitching, the main buoyant body remaining wholly submerged at all times, but the center of surface is low which reduces the surface above water exposed to dynamic forces of wind and waves tending to cause the apparatus to roll, pitch or capsize. In addition, due to the skeleton type of connection of the main buoyant body and the auxiliary body and deck, the total displacement of the apparatus is changed only a small percentage by the rise and fall of waves. Further, the skeleton presents a streamlined surface of small area which is but slightly affected by the dynamic lateral pressure of wind, waves, and water currents. Because of the reduced forces acting due to the low centers of buoyancy and volume and the skeleton connecting structure, the degree of equilibrium stability is high relative thereto despite the low metacenter of the apparatus, and because the center of gravity is low the range of stable equilibrium is large.

From the normal deep water floating condition the apparatus can be adjusted to a condition adapted for floating in shallow water by bringing together the centers of buoyancy of the main and auxiliary bodies. This raises the main body to the surface along with the auxiliary body so that the apparatus has a shallow draft. In shallow water the waves do not reach large amplitudes so that rolling is not a problem and the apparatus is very stable by virtue of the large horizontal area shallow draft barge type construction of the main buoyancy body which produces an extremely high metacenter with the resulting high degree and range of equilibrium stability.

From either the normal deep water floating condition or from the shallow water floating condition the apparatus can be adjusted to a position in which it rests on the bottom of the water. This is accomplished by separating the centers of buoyancy of the buoyant bodies until the main buoyant body rests on bottom, thereafter adjusting the buoyancies of one or both of the bodies until the apparatus as a whole is no longer buoyant and then bringing together the centers of buoyancy of the two bodies. Thereafter, if not already done, the buoyancies of both bodies are adjusted to a minimum. Because the apparatus as a whole is maintained in a buoyant condition during the process of lowering the main buoyant body and structure to the bottom, the apparatus is at all times stable and under control as distinguished from the unstable and out of control condition attending a free fall following rendering the whole apparatus non-buoyant. This is particularly important in deep water where the length of the fall will be great. Because the center of gravity of the final sunken apparatus is low and the supporting base broad, the apparatus in its resting on bottom condition is stable to a high degree and over a large range.

The apparatus can be returned to floating condition by a process just the reverse of the sinking process. The centers of buoyancy of the bodies are separated until the auxiliary buoyancy body is just at the surface and thereafter, if not already done, the auxiliary buoyancy body is rendered buoyant. Thereafter the whole apparatus is rendered buoyant but the main buoyancy body is not rendered sufficiently buoyant to float the apparatus without the aid of the auxiliary buoyancy body. The centers of buoyancy of the two bodies are then brought together as closely as desired depending on the depth of the water and the desired height of the deck above the surface of the water. If the auxiliary buoyancy body has enough buoyancy to float that part of the structure which becomes exposed above the surface as the bodies are brought together, no adjustment in buoyancy need be made during this step, the auxiliary body merely sinking lower in the water. Otherwise, it may be necessary to adjust the buoyancy of the main body periodically during this step, but such adjustment is made only in such increments as will raise the auxiliary body back up almost out of the water after it has previously almost sunk. Since the main structure is thus raised only after the apparatus as a whole has been rendered buoyant and the main buoyancy body is never made sufficiently buoyant to float the whole apparatus, when the apparatus is floating with the main buoyancy body submerged, the apparatus is at all times stable. Any tendency toward a free rise when the buoyance of either the main or auxiliary body is decreased is immediately checked by rising of the auxiliary body out of the water thereby causing a compensating loss of over all buoyancy.

The apparatus can be towed or self-propelled both on the surface as in shallow water, partially submerged as in deep water, and also skidded along bottom in a semi-buoyant condition in either deep or shallow water. In the latter case the compartmentation of the bodies enables them to be selectively flooded to adjust the inclination of the bodies so that one end of the structure is floating off bottom while the other end still rests on bottom. Then the flat bottom of the main buoyancy body adapts the apparatus to the skidding on bottom mode of transportation because it presents a uniform low angle of attack and distributes the unbuoyed weight over a wide area. The shallow draft of the main body adapts the apparatus to floating transport in shallow water. The submersible main buoyancy body makes deep water floating transport possible by making the apparatus seaworthy in all weather so that it is safe to take it on long trips.

The apparatus is adapted for use in which it must rest on bottoms of uneven contour by dividing the apparatus along one or more vertical planes into a plurality of sections which are pivotally linked together. Superstructures such as derricks, are supported rigidly on one of the sections or pivotally connected to a plurality of the sections or else erected and rigidly secured only after the apparatus has been sunk on location. In this manner the bottoms of the individual sections can assume inclinations conforming to different areas of the bottom of the water beneath the apparatus, thereby assuring a large area of contact between the apparatus and the bottom of the water so that the apparatus will be stable.

The sectional construction of the apparatus also facilitates controlled detachment of the apparatus from the bottom in case the bottom includes a layer of muck overlying the hard bottom. The main buoyant body of one or more sections can be adjusted to maximum buoyancy to free it from the suction grip of the muck while one or more other sections are used as anchors. This prevents the apparatus as a whole from becoming buoyant even without including the buoyancy of the auxiliary buoyancy bodies, which would cause the apparatus to rise freely and erratically when the suction hold was broken. After each section or group of sections is separately freed it is used as an anchor during the freeing of the other section or sections. After all are free the apparatus can be raised in the manner previously described.

To take care of the case of extremely deep muck in which the apparatus might become hopelessly mired so that it could not be freed even by the use of maximum buoyancy on all sections, the apparatus is provided with a plurality of studs adjustably connected to the main structure thereof so as to be extensible below the level of the main buoyant body to act as stilts or piles for supporting the structure in part, thereby preventing the main buoyant body from sinking too deep in the muck. In addition, mechanical means reacting against the studs may be used to help free the main body and structure from the muck when it is desired to break away. The same mechanical means can also be used for adjusting the positions of the studs relative to the structure and to force individual studs into the bottom when locating on bottom and when breaking away. The studs also give lateral and vertical stability to the apparatus, serving as earth anchors to secure the apparatus in fixed position on bottom and are thus useful on clean, hard bottom as well as muck covered or soft bottoms. In extreme cases, should it be found impossible to remove the studs from the bottom after breaking away the rest of the apparatus, the studs can be left behind.

For a detailed description of a preferred embodiment of the invention, reference will now be made to the accompanying drawings in which.

Figure 1:
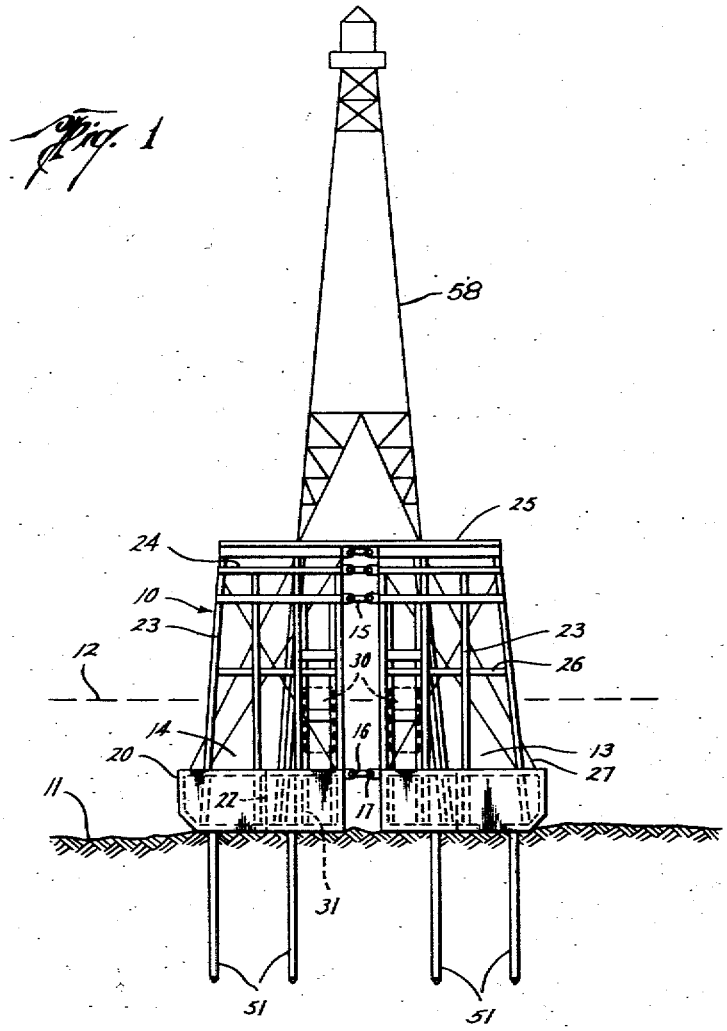
Figure 1 is an end elevational view of an apparatus according to the invention particularly suited as a base for offshore drilling for petroleum, the apparatus being shown resting on bottom.
Figure 2:
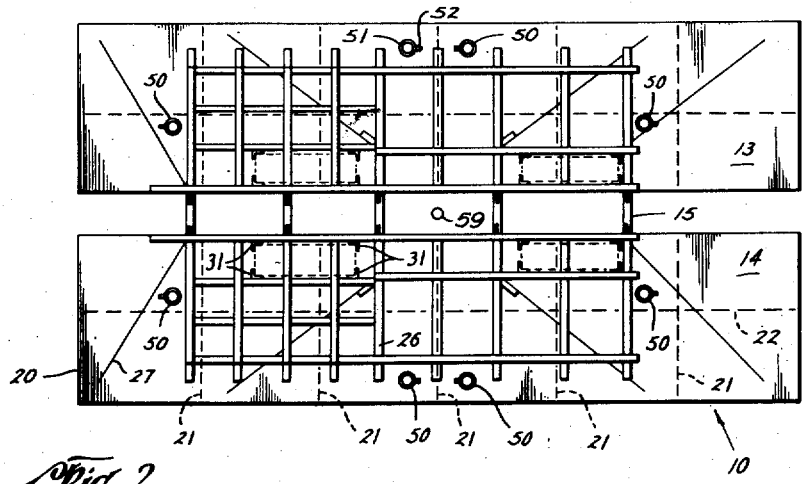
Figure 2 is a top plan view of the apparatus shown in Figure 1[;], *with the upper decks or working platforms omitted to show more clearly the structure therebelow;*
Figure 3:
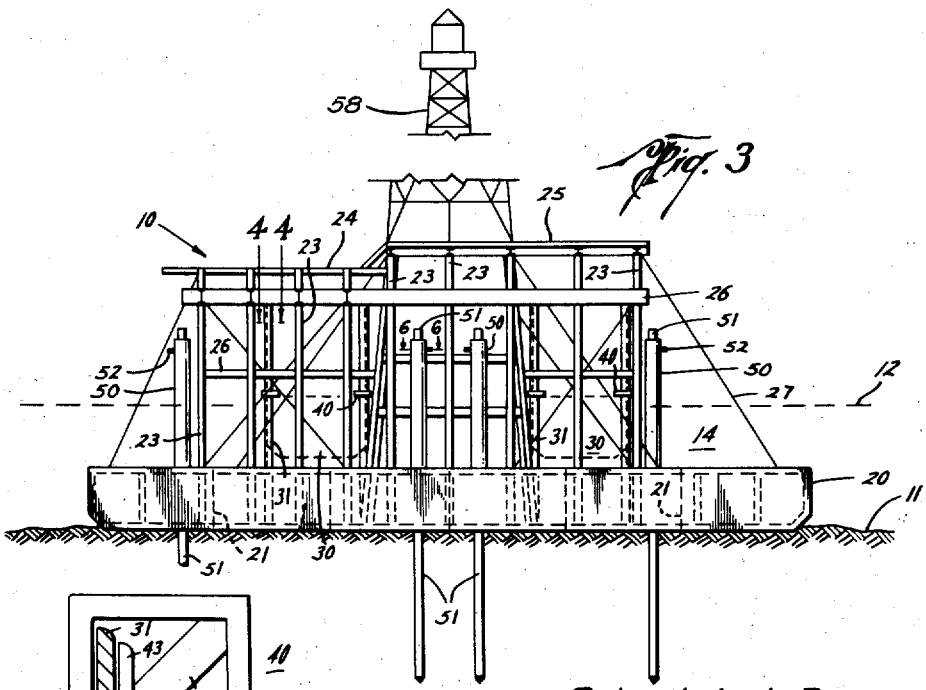
Figure 3 is a side elevational view of the apparatus of Figure 1.
Figure 4:
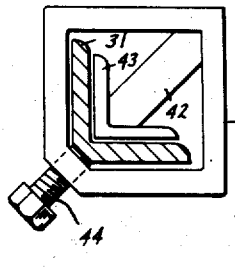
Figure 4 is a sectional view taken on line 4—4 of Figure 3.

Referring first to Figures 1, 2, and 3, there is shown an apparatus 10 constituting an operational base for offshore drilling. The apparatus is resting on the firm bottom 11 of a body of water whose surface is indicated at 12. The apparatus comprises like port and starboard sections 13' and 14. These sections are connected together by a number of links as shown at 15. Each of the ends of each link is pivotally connected to the adjoining section by means such as a universal joint as shown at 16 and 17. The links are of equal length and parallel to each other when the sections are parallel. This type of connection provides a liberal range of relative motion of the sections to conform to the contour of the bottom. Since the port and starboard sections of the apparatus are identical except for the reversal of sides, only one section will be described further.

Section 14 includes a principal structure comprising a main buoyancy body in the form of a hollow, broad beam, shallow draft, flat bottom, full decked barge 20. The barge will usually be made of steel, as will the remainder of the apparatus. The barge is divided into a plurality of separate water tight compartments by transverse and longitudinal bulkheads 21 and 22. Each of these compartments can be selectively adjusted as to buoyancy by changing the nature of the fluid content thereof from a dense fluid to a light fluid. For example, valves may be provided in the compartments to admit water thereto and pumps may be provided for expelling the water and replacing it with air. Since the particular means used for adjusting the buoyancy is not part of the invention, any one of several known means being suitable, such means have for clarity been omitted from the drawings. Connected to and rising from the barge is a framework of studs 23 supporting elevated working platforms or decks 24 and 25. The framework is suitably braced with cross ties and cables as shown at 26 and 27.

To the principal structure above described there are adjustably connected one or more auxiliary buoyancy bodies in the form of hollow pontoons 30. Each pontoon can be adjusted in buoyancy by means similar to that used for the compartments of the barge. If desired, the pontoons may be compartmented but this is not usually necessary. Each pontoon is mounted in a guideway comprising a plurality of vertical angle irons as shown at 31. The guideways extend all the way to the bottom of the barge which is provided with deck openings adapted to receive the pontoons. The pontoons can be adjusted in height in the guideways and anchored in any position between the top of the guideways just beneath the decks 24 and 25 and the bottom of the guideways where the pontoons nest within the openings in the barge. In the latter positions the centers of buoyancy of the pontoons are close to those of the barge, being at about the same level.

A variety of means can be used for adjusting the relative positions of the barge and pontoons. For example the barge and pontoons can be raised and lowered in the water and with respect to each other by adjusting their buoyancies. Such as system is illustrated in Figures 1, 2, and 3. Likewise, a variety of means can be used to anchor the pontoons relative to the principal structure. In Figures 1, 2, and 3 one form of anchor means is illustrated as comprising collars 40 around the guideways and adjustably clamped thereto. The buoyancy of the pontoons tends to cause them to rise and the collars limit their upward travel so that the position of each pontoon is thereby fixed. Obviously, if desired, the collars could be fixedly connected to the pontoons so that it would be unnecessary to rely upon the upward buoyant force of the pontoons to maintain their elevation, or alternatively additional free collars could be provided below each pontoon to limit its downward travel.

The details of the collars 40 are best shown in Figure

4. The collar includes a square ring 41 adapted to fit closely over guideway 31. Within a corner of the ring opposite the corner of the angle iron guideway there is secured a brace 42 carrying a clamp 43. Through the opposite corner of the ring is threaded a lock screw 44. The ring is secured to the guideway by tightening the set screw.

Referring once again to Figures 1 through 3, in addition to the principal structure and the pontoons described above the apparatus further includes a number of guide sleeves 50 through which piling 51 extends into the earth beneath the water. *The sleeves not only guide the piles but engage them laterally, that is, at the sides or transverse to their axes, so that the piles can provide lateral support for the structure.* For clarity the sleeves have been omitted from Figure 1 only the piling being shown. The piling may be free within the sleeves or releasably secured thereto by means of set screws as shown at 52. The piling may be driven into the earth after the barge has been sunk or it can be driven first to locate the barge before it is placed on bottom. In both cases the piling serves to anchor the barge in a fixed position on bottom with respect to both horizontal and vertical movement. When it is desired to move the apparatus, the piles can either be pulled or left in the ground. If desired other means besides driving and pulling can be used for adjusting the position of the principal structure relative to the piling.

After the apparatus has been sunk over the desired location, suitable drilling equipment can be placed upon the decks thereof. Included in such equipment will be a derrick 58 placed so as to bridge over the slot or space between the sections 13 and 14 and so as to be directly over the well indicated schematically at 59 in Figure 2. Alternatively, as described in my prior applications hereinabove referred to and as shown in the drawings hereof, the derrick and other equipment can be in position on the apparatus at all times, including transportation to and from location, and raising and lowering.

*It is to be noted that the deck 25, extending across the end of both sections of the apparatus, as shown in Figure 1, integrates the two sections so that they can be operated as one. Obviously, the deck will have to be taken apart, as well as joints 15—17, in order to separate the two sections of the apparatus. This is also true of the derrick 58 which further ties the apparatus together as a unit. When the two sections of the apparatus are thus held together, the two principal structures form one structure with the main buoyancy bodies forming in effect a single large hollow member with a slot in the middle. The four auxiliary buoyancy bodies or pontoons 30, however, continue to be independently operable, being azimuthally disposed around the center of the apparatus and the derrick.*

In use of the apparatus described in Figures 1–4, the method previously outlined will be followed. In brief, the apparatus will be floated away from shore with the barge at the surface and the pontoon nested therein. As deep water is reached the barge will be lowered beneath the surface, the pontoons however remaining at the surface. When the desired drilling location is reached, the barge will be lowered further until it rests on bottom. It will then be completely flooded and the pontoons nested and flooded. Also the anchor piling will be driven. After the well is completed, the pontoons will be surfaced, the barge rendered buoyant and raised and the whole apparatus floated away, the barge being raised to the surface when shallow water is reached. During the removal process it may be desirable to drive guide piling between the sections and to unlink them and skid them away separately so as to avoid damage to the completed well.

Figure 5:
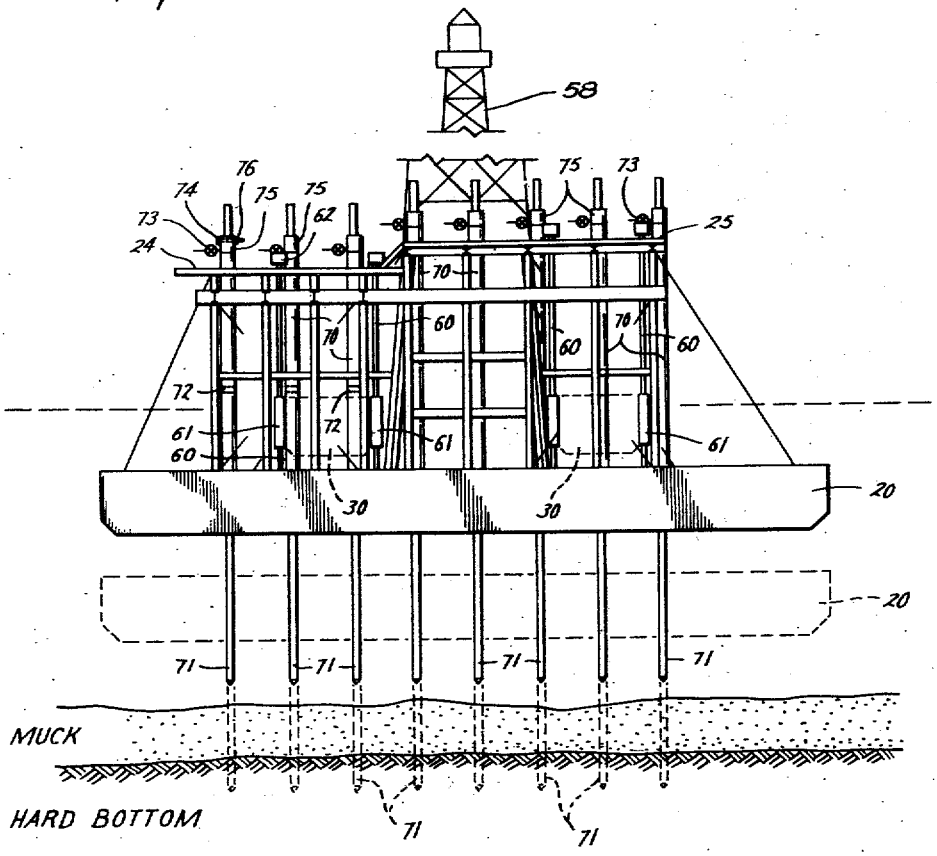
Figure 5 is a view similar to Figure 3 showing a modified form of the apparatus supported over a muck bottom.
Figure 6:
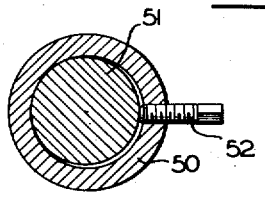
*Fig. 6 is a sectional view taken on the line 6—6 of Fig. 3.*
Figure 7:
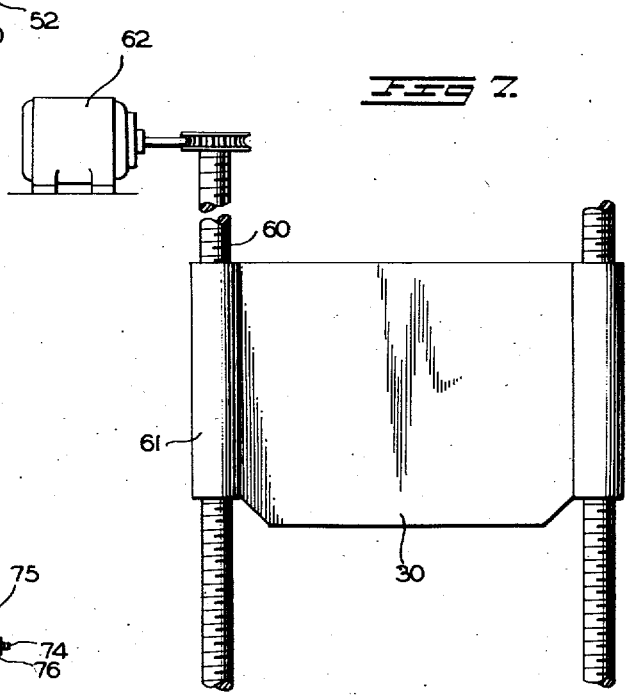
*Fig. 7 is a detailed view of the pontoon controlling means of Fig. 5.*
Figure 8:
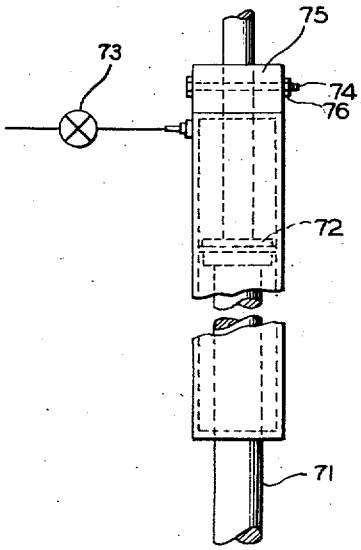
*Fig. 8 is a detailed view of the pile controlling means of Fig. 5.*

Referring now to Figure 5, there is illustrated an apparatus for the most part identical with that of Figures 1–3 but modified as to the means for adjusting the position of the pontoons and the piles relative to the principal structure. As shown each of the pontoons 30 is connected to the principal structure by means of four threaded shafts 60 passing through internally threaded sleeves 61 secured to the four corners of the pontoon. The shafts are mounted in antifriction bearings and rotated by means of motors 62 which may be electric motors operating through reduction gears. The threaded sleeves can be in the form of a plurality of discs individually mounted on antifriction bearings or can be in any other form used in ball bearing screw jacks, or can be simple well lubricated threaded tubes. By rotating the motors, the shafts are rotated in the sleeves causing relative motion of the pontoons relative to the principal structure including the barge.

For the sleeves 50 of the embodiment of the invention shown in Figures 1–3, there are substituted in the apparatus of Figure 5 a plurality of hydraulic cylinders 70. Within these cylinders travel steel piles 71, each provided with a piston 72 fitting closely within the cylinder. High pressure liquid is supplied to and exhausted from the ends of the cylinders through suitable valve means as shown at 73 from a hydraulic pump not shown. By varying the quantity of liquid in the cylinders above and below the pistons, the positions of the piles relative to the principal structure can be varied. The travel of the pistons is such that the piles can be retracted sufficiently so as not to protrude below barge 20 and can be extended sufficiently to support the barge above a muck bottom and extend through the muck into the hard bottom a sufficient distance to get a firm bearing.

In locating the apparatus of Figure 5 over a muck bottom, the piles may be extended to the top of the muck as shown and then locked in position. Mechanical anchor means releasably interconnecting the piles and cylinders may be used for this purpose. For example, a bolt 74 may be passed through a hole in one of the tubular extensions 75 connected to the top of each cylinder 70 and thence through a hole in the top of the pile and out through another hole in extension 74 and secured with a nut 76. The barge and pontoons are then rapidly flooded to sink the apparatus rapidly to gain momentum to drive the piles through the muck into the hard bottom. An intermediate position of the apparatus as it sinks is indicated in Figure 5 in dotted lines. Stability and equilibrium are maintained at this stage of operations and the apparatus is under control due to the fact that the piles are already in contact with the muck and soon reach hard bottom so that the rate of descent is controlled from below by friction with the bottom. Additional control is had from guide piling placed adjacent the apparatus prior to the descent to guide it to the proper location.

When the apparatus comes to rest due to the buoyant effect of the muck bottom and the increased resistance of the hard bottom to the piles, it can be leveled by hydraulically separately forcing the individual piles into and out of the hard bottom and then relocking them mechanically.

When it is desired to remove the apparatus, the pontoons are raised to the surface and deflooded and the barge is deflooded until the apparatus as a whole is buoyant. The piles are then withdrawn hydraulically and the apparatus can be handled thereafter as in the case of the apparatus of Figures 1–3. The piles keep the barge from sinking too far into the muck where it might become stuck.

*In both embodiments of the invention adjustable means is provided for connecting the piles to the principal structure at the desired position, in the first embodiment such means comprising tubes 50 and screws 52, and in the second embodiment cylinders 70 and pistons 72.*

While preferred embodiments of the invention have been shown and described, it is obvious that many modifications thereof can be made by one skilled in the art without departing from the spirit of the invention and it is desired to protect by Letters Patent all forms of the invention falling within the scope of the following claims.

What I claim is:

1. A base for subterranean submarine operations comprising a principal structure including a hollow, flat bottom, shallow draft, broad beam, fully decked barge, a plurality of long slender horizontally spaced studs connected to and rising vertically above the barge, a deck supported by and connected to the studs, and means to flood and deflood the barge to adjust its buoyancy over a range from a buoyant to a non-buoyant condition, a hollow pontoon, means to flood and deflood the pontoon to adjust its buoyancy over a range from a buoyant to a non-buoyant condition, said pontoon having less buoyancy than said barge when both are adjusted for maximum buoyancy, means connecting the pontoon to the principal structure, said connecting means being adjustable to dispose and hold the center of buoyancy of the pontoon at any level relative to the center of buoyancy of the barge over a range from closely adjacent thereto to substantially above same, a plurality of piles, and means connecting the piles to the principal structure with the piles disposed with their axes vertical and spaced apart horizontally, the last said connecting means being adjustable to dispose and hold the lower ends of the piles relative to the bottom of the barge at any level over a range from closely adjacent thereto to substantially below same.

2. A base for subterranean submarine operations comprising a principal structure including a hollow, flat bottom, shallow draft, broad beam, fully decked barge, a plurality of long slender horizontally spaced studs connected to and rising vertically above the barge, a deck supported by and connected to the studs, and means to flood and deflood the barge to adjust its buoyancy over a range from a buoyant to a non-buoyant condition, a hollow pontoon, means to flood and deflood the pontoon to adjust its buoyancy over a range from a buoyant to a non-buoyant condition, said pontoon having less buoyancy than said barge when both are adjusted for maximum buoyancy, means connecting the pontoon to the principal structure, said connecting means being adjustable to dispose and hold the center of buoyancy of the pontoon at any level relative to the center of buoyancy of the barge over a range from closely adjacent thereto to substantially above same, a plurality of piles, and means connecting the piles to the principal structure with the piles disposed with their axes vertical and spaced apart horizontally, the last said connecting means being adjustable to dispose and hold the lower ends of the piles relative to the bottom of the barge at any level over a range from closely adjacent thereto to substantially below same, the last said connecting means including power means by which the piles can be positively moved over their range of adjustment and forced into and withdrawn from a substance adjacent the bottom of the barge.

3. A base for subterranean submarine operations comprising a principal structure including a large hollow member, a deck, and means connecting said deck to said large member with the deck spaced therefrom and disposed thereabove, means to flood and deflood said member to adjust its buoyancy over a range from buoyant to non-buoyant condition, a smaller hollow member, means to flood and deflood said hollow member to adjust its buoyancy over a range from buoyant to a non-buoyant condition, said smaller member having less buoyancy than that of said large member when both are adjusted for maximum buoyancy, means connecting said smaller member to said principal structure, said connecting means being adjustable to dispose and hold the center of buoyancy of said smaller member at any level relative to the center of buoyancy of said large member over a range from closely adjacent thereto to substantially above same, a plurality of elongated supporting members, means connecting said supporting members to said principal structure with their axes transverse to the horizontal plane of said structure and spaced apart horizontally, the last said connecting means being adjustable to dispose and hold the lower ends of said elongated members relative to the bottom of said large hollow member at any level over a range from closely adjacent thereto to substantially below same.

4. A base for subterranean submarine operations comprising a principal structure including a large hollow member, a deck, and a derrick, said large hollow member having a slot therein extending inwardly from the outer periphery thereof providing a space through which drilling operations can be conducted, and means connecting said deck and derrick to said large member with the deck spaced from said large member and disposed thereabove and said derrick rising above said deck and disposed over said slot, means to flood and deflood said member to adjust its buoyancy over a range from buoyant to non-buoyant condition, a smaller hollow member, means to flood and deflood said hollow member to adjust its buoyancy over a range from buoyant to a non-buoyant condition, said smaller member having less buoyancy than that of said large member when both are adjusted for maximum buoyancy, means connecting said smaller member to said principal structure, said connecting means being adjustable to dispose and hold the center of buoyancy of said smaller member at any level relative to the center of buoyancy of said large member over a range from closely adjacent thereto to substantially above same, a plurality of elongated supporting members, some of said supporting members being disposed on each side of said slot, and means connecting said supporting members to said principal structure with their axes transverse to the horizontal plane of said structure and spaced apart horizontally, the last said connecting means being adjustable to dispose and hold the lower ends of said elongated members relative to the bottom of said large hollow member at any level over a range from closely adjacent thereto to substantially below same.

5. A base for subterranean submarine operations comprising a principal structure including a large hollow member, a deck, and a derrick, said large hollow member having a slot therein extending inwardly from the outer periphery thereof at least to the center of said large member, said slot providing a space through which drilling operations can be conducted, and means connecting said deck and derrick to said large member with the deck spaced from said large member and disposed thereabove and said derrick rising above said deck and disposed over said slot at the center of said large member, means to flood and deflood said member to adjust its buoyancy over a range from buoyant to non-buoyant condition, a smaller hollow member, means to flood and deflood said hollow member to adjust its buoyancy over a range from buoyant to a non-buoyant condition, said smaller member having less buoyancy than that of said large member when both are adjusted for maximum buoyancy, means connecting said smaller member to said principal structure, said connecting means being adjustable to dispose and hold the center of buoyancy of said smaller member at any level relative to the center of buoyancy of said large member over a range from closely adjacent thereto to substantially above same, a plurality of elongated supporting members, said supporting members being azimuthally spaced apart around said center of the large member, and means connecting said supporting members to said principal structure with their axes transverse to the horizotnal plane of said structure and spaced apart horizontally, the last said connecting means being adjustable to dispose and hold the lower ends of said elongated members relative to the bottom of said large hollow member at any level over a range from closely adjacent thereto to substantially below same.

6. A base for subterranean submarine operations comprising a principal structure including a large hollow member, said large member having a slot therein extending inwardly from the outer periphery thereof providing a space through which drilling operations can be conducted, a deck, and means connecting said deck to said large member with the deck spaced therefrom and disposed thereabove, means to flood and deflood said member to adjust its buoyancy over a range from buoyant to non-buoyant condition, at least one smaller hollow member disposed at each side of said slot, means to flood and deflood each said hollow member to adjust its buoyancy over a range from buoyant to a non-buoyant condition, each said smaller member having less buoyancy than that of said large member when both are adjusted for maximum buoyancy, means connecting each said smaller member to said principal structure, said connecting means being adjustable to dispose and hold the center of buoyancy of each said smaller member at any level relative to the center of buoyancy of said large member over a range from closely adjacent thereto to substantially above same, a plurality of elongated supporting members, some of said supporting members being disposed on each side of said slot, means connecting said supporting members to said principal structure with their axes transverse to the horizontal plane of said structure and spaced apart horizontally, the last said connecting means being adjustable to dispose and hold the lower ends of said elongated members relative to the bottom of said large hollow member at any level over a range from closely adjacent thereto to substantially below same.

7. A base for subterranean submarine operations comprising a principal structure including a large hollow member, a deck, a derrick, and means connecting said deck and derrick to said large member with the deck spaced from the large member and disposed thereabove and said derrick rising above said deck, means to flood and deflood said member to adjust its buoyancy over a range from buoyant to non-buoyant condition, a plurality of smaller hollow members disposed around said derrick in different azimuthal positions relative thereto, means to flood and deflood each said hollow member to adjust its buoyancy over a range from buoyant to a non-buoyant condition, each said smaller member having less buoyancy than that of said large member when both are adjusted for maximum buoyancy, means connecting each said smaller member to said principal structure, said connecting means being adjustable to dispose and hold the center of buoyancy of each said smaller member at any level relative to the center of buoyancy of said large member over a range from closely adjacent thereto to substantially above same, a plurality of elongated supporting members, said supporting members being azimuthally spaced around said derrick, means connecting said supporting members to said principal structure with their axes transverse to the horizontal plane of said structure and spaced apart horizontally, the last said connecting means being adjustable to dispose and hold the lower ends of said elongated members relative to the bottom of said large hollow member at any level over a range from closely adjacent thereto to substantially below same.

8. A base for subterranean submarine operations comprising a principal structure including a large hollow member, a deck, and means connecting said deck to said large member with the deck spaced therefrom and disposed thereabove, means to flood and deflood said member to adjust its buoyancy over a range from buoyant to non-buoyant condition, a smaller hollow member, means to flood and deflood said hollow member to adjust its buoyancy over a range from buoyant to a non-buoyant condition, said smaller member having less buoyancy than that of said large member when both are adjusted for maximum buoyancy, means connecting said smaller member to said principal structure, said connecting means being adjustable to dispose and hold the center of buoyancy of said smaller member at any level relative to the center of buoyancy of said large member over a range from closely adjacent thereto to substantially above same, said connecting means constraining the motion of said *smaller* member throughout said range of levels to travel in a straight line transverse to the horizontal plane of said structure, a plurality of elongated supporting members, means connecting said supporting members to said principal structure with their axes transverse to the horizontal plane of said structure parallel to said line of travel of said smaller hollow member and spaced apart horizontally, the last said connecting means being adjustable to dispose and hold the lower ends of said elongated members relative to the bottom of said large hollow member at any level over a range from closely adjacent thereto to substantially below same.

9. A base for subterranean submarine operations having two sections, means releasably connecting said two sections together, each of said sections comprising a principal structure including a large hollow member, a deck, and means connecting said deck to said large member with the deck spaced therefrom and disposed thereabove, means to flood and deflood said member to adjust its buoyancy over a range from buoyant to non-buoyant condition, a smaller hollow member, means to flood and deflood said hollow member to adjust its buoyancy over a range from buoyant to a non-buoyant condition, said smaller member having less buoyancy than that of said large member when both are adjusted for maximum buoyancy, means connecting said smaller member to said principal structure, said connecting means being adjustable to dispose and hold the center of buoyancy of said smaller member at any level relative to the center of buoyancy of said large member over a range from closely adjacent thereto to substantially above same, a plurality of elongated supporting members, and means connecting said supporting members to said principal structure with their axes transverse to the horizontal plane of said structure and spaced apart horizontally, the last said connecting means being adjustable to dispose and hold the lower ends of said elongated members relative to the bottom of said large hollow member at any level over a range from closely adjacent thereto to substantially below same, and a derrick removably mounted on said two sections with part of the derrick supported by each section, the said supporting members of the two sections together being disposed on all sides of said derrick to provide uniform support therefor.

*10. A base for subterranean submarine operations comprising a principal structure including means for buoying the base having a ballast capacity, means for ballasting and deballasting the first said means to adjust the buoyancy thereof over a range from positive to negative buoyancy, a working platform, means connecting said platform to the first said means with the platform at a level above the first said means, a plurality of piles, means for guiding said piles relative to said structure and for laterally engaging the piles in different positions including a position in which the piles extend below the first said means, and means to hold said piles against vertical movement in said means for guiding the piles, the means to hold said piles being adjustable to hold said piles in any of a plurality of different vertical positions; said structure having a slot for the passage of well drilling tools, and a derrick on said structure extending over and above said slot; second means having a ballast capacity for assisting in buoying the base, means for ballasting and de-ballasting said second means to adjust the buoyancy thereof over a range from positive to negative buoyancy, said second means having less maximum buoyancy than the first said means and including two parts whose levels relative to the principal structure are independent of each other, and means for holding said second means relative to said principal structure at different levels including a level in which the center of displacement of said second means is about that of the first said means.*

*11. A base for subterranean submarine operations com-*

*prising a principal structure including means for buoying the base having a ballast capacity, means for ballasting and de-ballasting the first said means to adjust the buoyancy thereof over a range from positive to negative buoyancy, a working platform, means connecting said platform to the first said means, second means for assisting in buoying said base, said second means having a ballast capacity, means for ballasting and deballasting said second means, and mens for holding said second means to said principal structure with its center of displacement at a desired level above that of the first said means to buoy the base; means for penetrating a marine bottom to prevent lateral shifting of said structure, means to connect said penetrating means to said structure to prevent relative vertical movement of said structure and penetrating means, the connecting means being adjustable to hold said penetrating means at different levels relative to said structure; and a derrick carried by said principal structure for assisting in carrying out said submarine operations after said principal structure has been positioned on said marine bottom and said bottom penetrating means is embedded therein.*

References Cited in the file of this patent or the original patent

UNITED STATES PATENTS

| | | |
|---|---|---|
| 1,276,327 | Chamberlin | Aug. 20, 1918 |
| 1,854,026 | Gamba | Apr. 12, 1932 |
| 2,248,051 | Armstrong | July 8, 1941 |
| 2,327,118 | Macknight | Aug. 17, 1943 |
| 2,334,992 | Crake | Nov. 23, 1943 |
| 2,399,611 | Armstrong | May 7, 1946 |
| 2,399,656 | Armstrong | May 7, 1946 |
| 2,422,168 | Kirby | June 10, 1947 |
| 2,515,540 | Willey et al. | July 18, 1950 |
| 2,525,955 | Scott | Oct. 17, 1950 |
| 2,528,089 | Siecke et al. | Oct. 31, 1950 |
| 2,580,911 | Harris | Jan. 1, 1952 |
| 2,592,448 | McMenimen | Apr. 8, 1952 |
| 2,603,068 | Wilson | July 15, 1952 |
| 2,653,452 | Dawson | Sept. 29, 1953 |